US007244353B2

(12) United States Patent
Whitmore et al.

(10) Patent No.: US 7,244,353 B2
(45) Date of Patent: Jul. 17, 2007

(54) METHOD OF AND SYSTEM FOR FLUID PURIFICATION

(75) Inventors: C. Barclay Whitmore, Seffner, FL (US); Javier G. Gutierrez, Dallas, TX (US); Jose G. Gutierrez, Tampa, FL (US)

(73) Assignee: Oil Purification Systems, Inc., Tampa, FL (US)

( * ) Notice: Subject to any disclaimer, the term of this patent is extended or adjusted under 35 U.S.C. 154(b) by 24 days.

(21) Appl. No.: 10/713,835

(22) Filed: Nov. 14, 2003

(65) Prior Publication Data

US 2004/0140271 A1 Jul. 22, 2004

Related U.S. Application Data

(60) Provisional application No. 60/426,712, filed on Nov. 15, 2002.

(51) Int. Cl.
*B01D 1/00* (2006.01)
*B01D 36/00* (2006.01)

(52) U.S. Cl. .......................... 210/85; 210/92; 210/180; 210/181; 210/182; 210/259; 210/295; 210/418; 210/444; 210/450; 210/453; 196/46.1; 196/121; 196/128

(58) Field of Classification Search ................. 210/85, 210/92, 180–182, 184, 248, 249, 418, 444, 210/450, 453, 440, 442, 443, 455, 457, 497.01, 210/259, 295; 123/196 A; 196/46, 46.1, 196/121, 128; 219/205; 96/218, 219
See application file for complete search history.

(56) References Cited

U.S. PATENT DOCUMENTS

| | | | |
|---|---|---|---|
| 2,559,267 A | * | 7/1951 | Winslow et al. ............ 210/133 |
| 2,743,019 A | | 4/1956 | Kovacs |
| 3,395,808 A | | 8/1968 | Offer |
| 3,503,511 A | * | 3/1970 | Spitzberg .................... 210/232 |
| 3,616,885 A | * | 11/1971 | Priest ......................... 196/128 |
| 3,956,071 A | | 5/1976 | O'Brien |
| 3,982,520 A | * | 9/1976 | Wheeler ................. 123/196 A |
| 4,057,502 A | * | 11/1977 | Crumrine et al. ........... 210/440 |
| 4,179,019 A | | 12/1979 | Danziger |
| 4,227,969 A | | 10/1980 | Engel |
| 4,289,583 A | | 9/1981 | Engel |
| 4,324,213 A | | 4/1982 | Kasting |
| 5,089,780 A | | 2/1992 | Megerle |
| 5,198,104 A | | 3/1993 | Menyhert |
| 5,234,592 A | * | 8/1993 | Schneider ................... 210/440 |
| 5,274,335 A | | 12/1993 | Wang et al. |
| 5,286,380 A | | 2/1994 | Mellen |
| 5,431,588 A | * | 7/1995 | Kucik ....................... 440/88 L |
| 5,462,676 A | | 10/1995 | Pitts |
| 5,540,086 A | | 7/1996 | Park et al. |
| 5,604,441 A | | 2/1997 | Freese, V et al. |

(Continued)

OTHER PUBLICATIONS

"The Original OilRig"; (Brochure); Refined Global Solutions Inc., publication date unknown.

*Primary Examiner*—Matthew O. Savage
(74) *Attorney, Agent, or Firm*—Winstead PC

(57) ABSTRACT

A method of and system for purifying fluid of an internal combustion engine or hydraulic system utilizes an evaporation chamber separate from a filtering chamber. A metering valve may be oriented between the filtering chamber and the evaporation chamber to control the flow of fluid to the evaporation chamber.

14 Claims, 6 Drawing Sheets

U.S. PATENT DOCUMENTS

| | | |
|---|---|---|
| 5,630,912 A | 5/1997 | LeFebvre |
| 5,776,315 A | 7/1998 | Lowry |
| 5,789,665 A | 8/1998 | Voelker et al. |
| 5,824,889 A | 10/1998 | Park et al. |
| 5,858,232 A | 1/1999 | Meissner |
| 5,889,683 A | 3/1999 | Ismail et al. |
| 6,072,152 A * | 6/2000 | Landry ................... 219/202 |
| 6,083,406 A * | 7/2000 | DePaul et al. ............ 210/742 |
| 6,096,208 A * | 8/2000 | Connelly et al. .......... 210/249 |
| 6,139,725 A | 10/2000 | Barr |
| 6,223,589 B1 | 5/2001 | Dickert et al. |
| 6,287,455 B1 | 9/2001 | Whitmore |
| 6,397,811 B1 | 6/2002 | Marsh |
| 6,509,749 B1 | 1/2003 | Buelna et al. |
| 6,535,001 B1 | 3/2003 | Wang |
| 6,575,018 B2 | 6/2003 | Berndorfer et al. |
| 6,590,402 B2 | 7/2003 | Wang et al. |
| 6,741,938 B2 | 5/2004 | Berndorfer |
| 6,750,763 B2 | 6/2004 | Ismail et al. |
| 6,776,024 B2 | 8/2004 | Jakoby |
| 6,786,080 B2 | 9/2004 | Jakoby et al. |
| 6,791,334 B2 | 9/2004 | Horie et al. |
| 6,799,458 B2 | 10/2004 | Ismail et al. |
| 6,810,717 B2 | 11/2004 | Heremans et al. |
| 6,867,603 B2 | 3/2005 | Nicholson et al. |
| 6,895,807 B2 | 5/2005 | Han et al. |
| 6,901,788 B2 | 6/2005 | Han et al. |
| 2002/0113596 A1 | 8/2002 | Horie et al. |
| 2002/0162390 A1 | 11/2002 | Ismail et al. |
| 2003/0046985 A1 | 3/2003 | Schoess |
| 2003/0062910 A1 | 4/2003 | Wang et al. |
| 2003/0222656 A1 | 12/2003 | Phillips et al. |
| 2004/0036487 A1 | 2/2004 | Heremans et al. |
| 2004/0123644 A1 | 7/2004 | Jakoby et al. |
| 2004/0177677 A1 | 9/2004 | Heremans et al. |
| 2005/0039521 A1 | 2/2005 | Han et al. |
| 2005/0056083 A1 | 3/2005 | Heremans et al. |

* cited by examiner

METHOD OF AND SYSTEM FOR FLUID PURIFICATION

CROSS-REFERENCE TO RELATED APPLICATIONS

This patent application claims priority to, and incorporates by reference the entire disclosure of, co-pending U.S. Provisional Patent Application No. 60/426,712, which was filed on Nov. 15, 2002.

BACKGROUND OF THE INVENTION

1. Technical Field of the Invention

The present invention is generally related to fluid purification, and more specifically, but not by way of limitation, to a system and method for fluid purification by utilizing separate evaporation and filtration chambers particularly adapted for purification of lubricating, hydraulic, and other oils.

2. Description of Related Art

Internal combustion engines and hydraulic systems typically utilize oil to lubricate the moving parts included therein. Over time, particulates and liquid contaminants such as water, antifreeze, and fuel degrade the performance of lubricating oil. Currently, contaminated oil is changed at regular intervals because the liquid contaminants and small particulates are not easily filtered out of the lubricating oil.

Alternatively, some purification systems employ a filter to filter out the particulates and an evaporator to remove the liquid contaminants from the lubricating oil. These systems involve a single canister that houses both a filter element and an evaporation chamber. However, the single canister design tends to be bulky, problematic to install, and more expensive to service. In some cases, single canister systems must be installed outside the engine.

For example, as described by U.S. Pat. No. 5,776,315, a single canister includes two chambers, a first chamber may include a filter for filtering particulates from the oil and a second chamber for evaporating some contaminants from the oil. The first chamber is located exterior to the second chamber. The oil flows to the first chamber, flows through the filter to the interior, second chamber. The second chamber includes a vent for releasing vaporized contaminants and a drain for receiving the filtered oil.

In addition, purification systems typically meter the flow of the oil by restricting the flow before it enters the evaporator. A metering valve controls the flow of oil to the evaporator to aid in evaporating the emulsified liquid contaminants of the oil. In most single canister designs, the metering valve is located prior to the filtration chamber in order to permit easier access to the metering valve. Because the metering valve is oriented prior to the filtration chamber, the lubricating oil includes particulates that may clog the metering valve.

As described by U.S. Pat. No. 6,287,455, herein incorporated by reference in its entirety, a purifier for lubricating oil includes an evaporator heating wand. The evaporation of liquid contaminants is increased by a ridged cup shape of the evaporator. The flow of oil is impeded by ridges along the exterior of the cup and therefore more evaporation may occur. The evaporated impurities are vented out of the purifier via an upper conduit. The cleaned oil pools at a lower portion of the evaporator and is then returned to the engine.

It would therefore be advantageous to provide a method of and system employing an evaporation chamber and separate filtration chamber.

SUMMARY OF THE INVENTION

The present invention relates to a method of and system for fluid purification. More particularly, one aspect of the invention includes a system for purifying fluid. The system includes a filtration canister for filtering particulates from the fluid and a separate evaporation canister for removing liquid contaminants by evaporation.

In another aspect, the present invention relates to a filtration canister for filtering particulates from a fluid. The filtration canister includes a filter element for removing the particulates from the fluid, a container for receiving the filter element and the fluid, a head for sealing an upper portion of the container, a threaded stud for securing the head and the container, and a centering spring for securing the filter element around the threaded stud.

In another aspect, the present invention relates to an evaporation canister for separating liquid contaminants from fluid. The evaporation canister includes an evaporator cup for receiving fluid. The evaporator cup includes a large substantially flat lower surface for increasing the surface area of the fluid. The evaporation canister also includes a container for receiving fluid and housing the evaporator, a head for sealing an upper portion of the container, and a heating wand for heating the fluid in the evaporator cup. The fluid flows underneath the heating wand and spreads to increase the surface area of the fluid, thereby facilitating evaporation of the liquid contaminants.

In another aspect, the present invention relates to a method for purifying fluid. The method includes the steps of providing fluid to a filtration canister, filtering particulates from the fluid via a filter element, transmitting the filtered fluid from the filtration canister to a separate evaporation canister, heating the filtered fluid to remove liquid contaminants, and removing the vaporized liquid contaminants from the evaporation canister.

BRIEF DESCRIPTION OF THE DRAWINGS

A more complete understanding of principles of the present invention may be obtained by reference to the following Detailed Description when taken in conjunction with the accompanying Drawings wherein.

DETAILED DESCRIPTION OF EXEMPLARY EMBODIMENTS OF THE INVENTION

A two canister fluid purification system provides several advantages for the effective purification of lubricating and hydraulic fluids. For example, by separating the filtration canister from the evaporation canister, a metering valve may be placed between the filtration canister and evaporation canister, thereby allowing proper control of the flow of fluid, such as oil or hydraulic fluid, to and from both canisters. In addition, the two canisters need not be located adjacent each other and therefore, the canisters may be installed in various locations to provide flexibility to the installer. It has been found that the evaporation canister should be placed in a location substantially above the engine so that gravity may assist the fluid in returning from the evaporation canister to the engine. However, the filtration canister may be located anywhere within the engine compartment, due to the fact that the filtration canister is under pressure.

Figure 1:
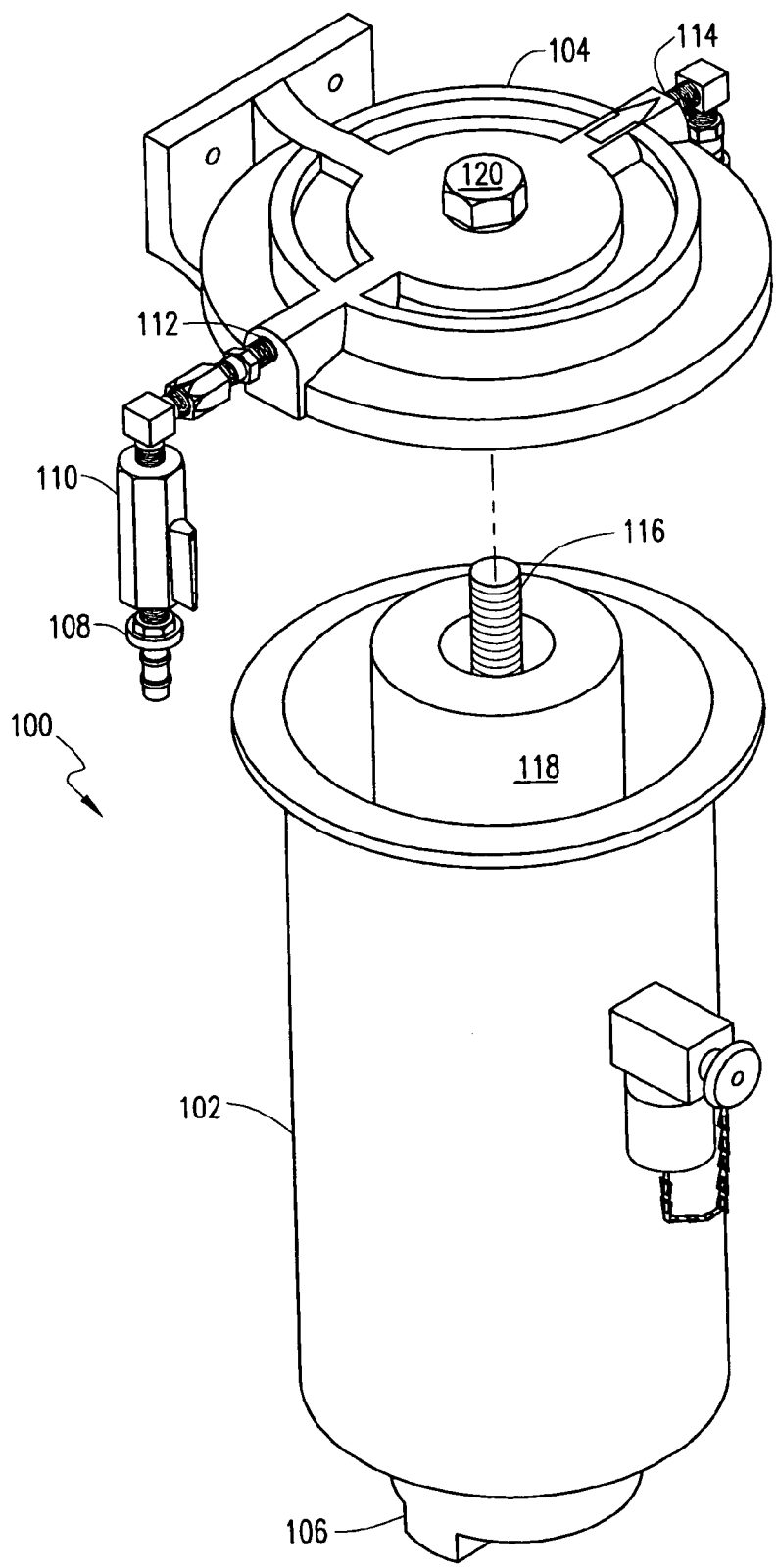
FIG. 1 is a perspective view of a filtration canister in accordance with an embodiment of the present invention.

Referring now to FIG. 1, a filtration canister 100 in accordance with an aspect of the present invention is illustrated. The filtration canister 100, in this particular embodiment, is manufactured as a substantially cylindrical container 102, having a head 104 and a base 106. In a preferred embodiment, the container 102 is formed of Aluminum Kone Drawing Quality (AKDQ) cold rolled steel and plated with "Commercial Bright Nickel Plating." In the preferred embodiment, the head 104 and base 106 are formed of 319 Cast Aluminum alloy. Although the preferred embodiment illustrates a cylindrically-shaped container formed of AKDQ and nickel plated, other orientations and materials with similar characteristics may be utilized in conjunction with the principles of the present invention. The filtration canister 100 receives fluid from an engine (not shown) via a pipe connection 108. A shut-off valve 110, oriented along the fluid flow prior to entry to the filtration canister 100, may be utilized to prevent the flow of fluid to the filtration canister 100. The shut-off valve 110, when engaged, causes the fluid in the engine to bypass the filtration canister 100 therefore allowing a user to take a sample of the fluid without shutting down the engine. When the shut-off valve 110 is not engaged, the fluid enters the filtration canister 100 for subsequent filtering. Both the pipe connection 108 and the shut-off valve 110 are in fluid communication with the filtration canister 100 via the head 104. An orifice 112 in the head 104 allows the fluid to enter the filtration canister 100 and a second orifice 114 allows the filtered fluid to exit the filtration canister 100 and proceed to an evaporation canister (not shown in this view). The head 104 also includes means for mounting the filtration canister 100 to an engine compartment. The head 104 and base 106 attach to the container 102 via a threaded stud 116 which is surrounded by a filter element 118. For example, the head 104 may include an orifice for receiving the threaded stud 116 and the head 104 is then fastened to the container 102 via a cap nut 120 and washer (not shown). The base 106 may receive the threaded stud 116 and fasten to the container 102 via a base nut.

Figure 2:
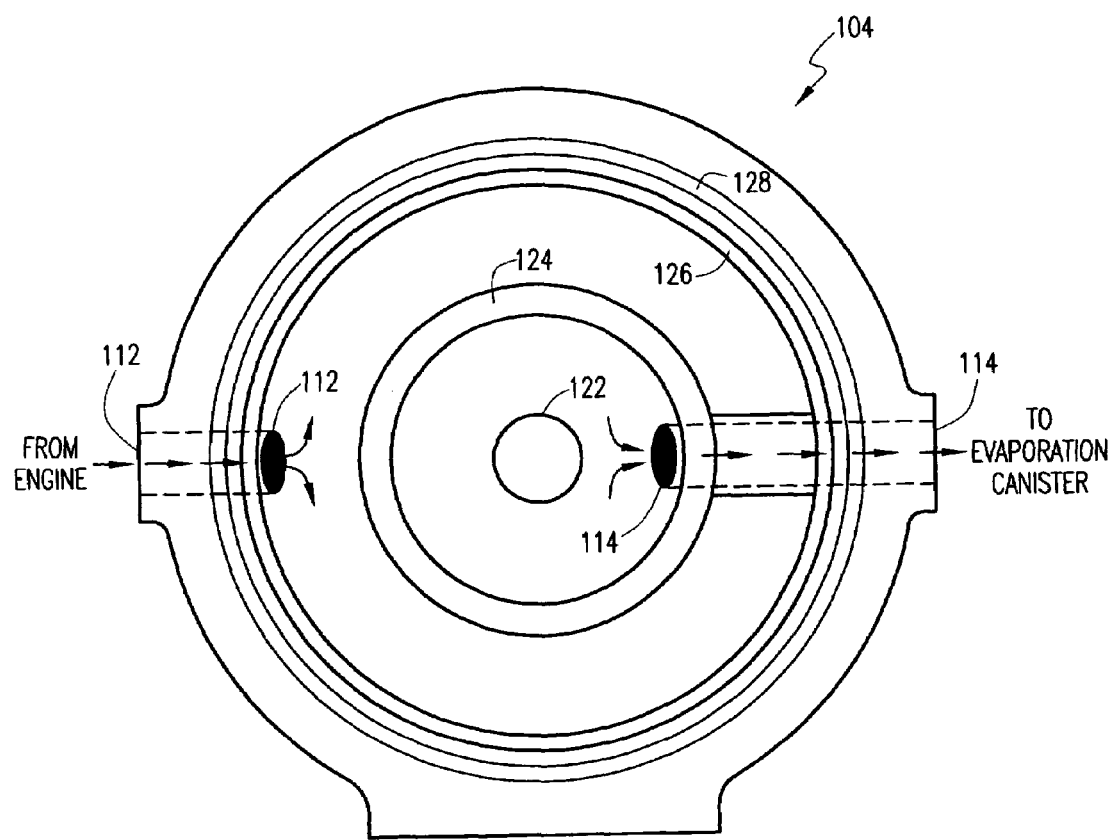
FIG. 2 is a bottom plan view of the head of the filtration canister of FIG. 1.

Referring now to FIG. 2, a bottom plan view of the head 104 of the filtration canister 100 of FIG. 1 is illustrated. As previously described, the head 104 includes an orifice 122 for receiving the cap nut 120 and washer for connecting with the threaded stud 116. The bottom face of the head 104 also may include a compression ring 124 molded into a portion of the bottom face. The compression ring 124, formed of Cast Aluminum alloy, compresses the filter element 118 when the head 104 is tightened over the container 102. The compression ring 124 also creates an fluid impervious seal that prevents fluid from bypassing the filter element 118. As shown by the directional arrows, contaminated fluid from the engine is transmitted to the filtration canister 100 via the orifice 112 which allows the fluid to drain into the outer portion of the container 102. The contaminated fluid then migrates through the filter element 118 toward a central portion of the container 102 near the threaded stud 116 in order to remove particulates from the fluid. The filtered fluid exits the filtration canister 100 via orifice 114 and flows to an evaporation canister (not shown). The head 104 also includes an outer raised edge 126 that is oriented to be placed inside the container 102. The raised edge 126 aids in preventing fluid from leaking out of the filtration canister 100. In addition, a gasket 128 may be placed exterior to the raised edge 126 to further enhance the sealing ability of the head 104 and container 102.

Figure 3:
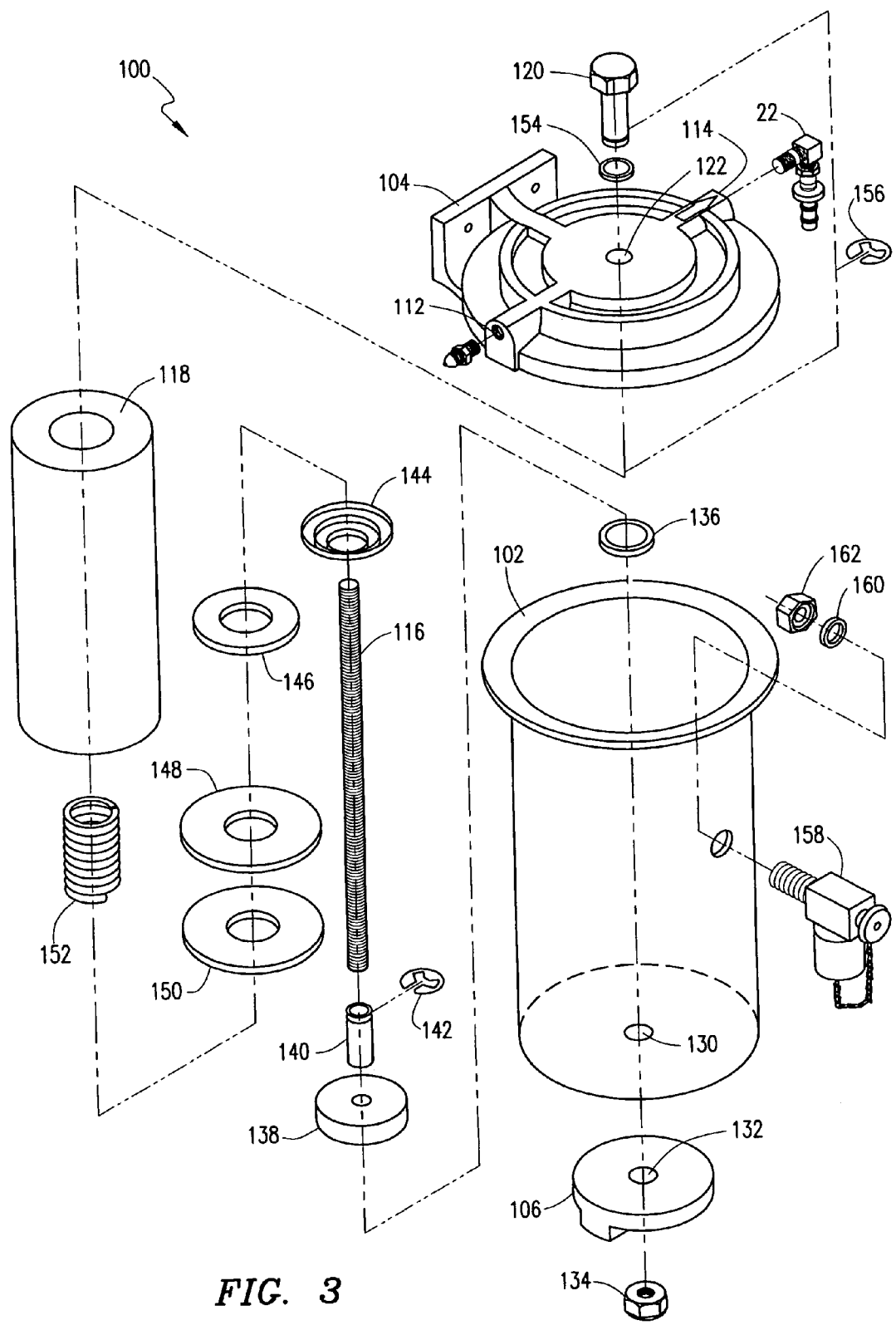
FIG. 3 is an assembly diagram of the filtration canister of FIG. 1.

Referring now to FIG. 3, an assembly diagram of the filter chamber of FIG. 1 is illustrated. As previously described, the threaded stud 116 is positioned through an orifice 130 of the container 102 and an orifice 132 of the base 106 and secured via a base nut 134. The threaded stud 116 is placed through a seal 136, stud holder 138, and sleeve 140 which are then locked in place with an E-ring 142. A spring 144 is placed above the E-ring 142 thus creating a platform for a sealing gasket 146, a fiber washer 148, and a support washer 150. The sealing gasket 146 may be formed of stainless steel in order to provide a firm support for the fiber washer 146 and the support washer 150. The support washer 150 may be formed as a nitrile washer for preventing fluid from bypassing the filter element 118. The support washer 150, in the preferred embodiment, is soft and impervious to fluid. Therefore, the support washer 150 provides compression against the filter element 118 and does not allow fluid to pass between the filter element 118 and the support washer 150, thereby preventing the bypass of the filter element 118.

A centering spring 152 is placed around the threaded stud 116 and may rest anywhere along the threaded stud 116. The centering spring 152 may be in threaded securement to the threaded stud 116 so that the centering spring 152 is rotated down to a particular location along the threaded stud 116. The centering spring 152 prevents the filter element 118, which is placed therearound, from shifting during movement or closure of the filter canister 100. The filtering element 118 may be any type of filter that effectively removes particulates from the fluid. For example, in the preferred embodiment, a depth filter is utilized for removing particulates, however, other types of filters, such as pleated filters, may be implemented in conjunction with aspects of the present invention. In the preferred embodiment, a 3 micron filter is implemented as the filtering element 118. Alternatively other classes of filters may be used such as a finer filter for hydraulic systems.

The head 104 is secured to the container 102 via the cap nut 120 and a washer 154. A second E-ring 156 may be secured around a lower portion of the cap nut 120 once inserted into the orifice 122. The second E-ring 156 prevents the cap nut 120 from being completely removed from the orifice 122. By not allowing complete removal of the cap nut 120, a user is less likely to drop or lose the cap nut 120 when servicing the filtration canister 100. In addition, the filtration canister 100 may include a sampling valve 158 for allowing a user to sample the fluid while the engine is running. The sampling valve 158 may be located anywhere along an outer surface of the container 102. The sampling valve 158 may be secured to the container 102 via an O-ring 160 and a hex nut 162.

Figure 4:
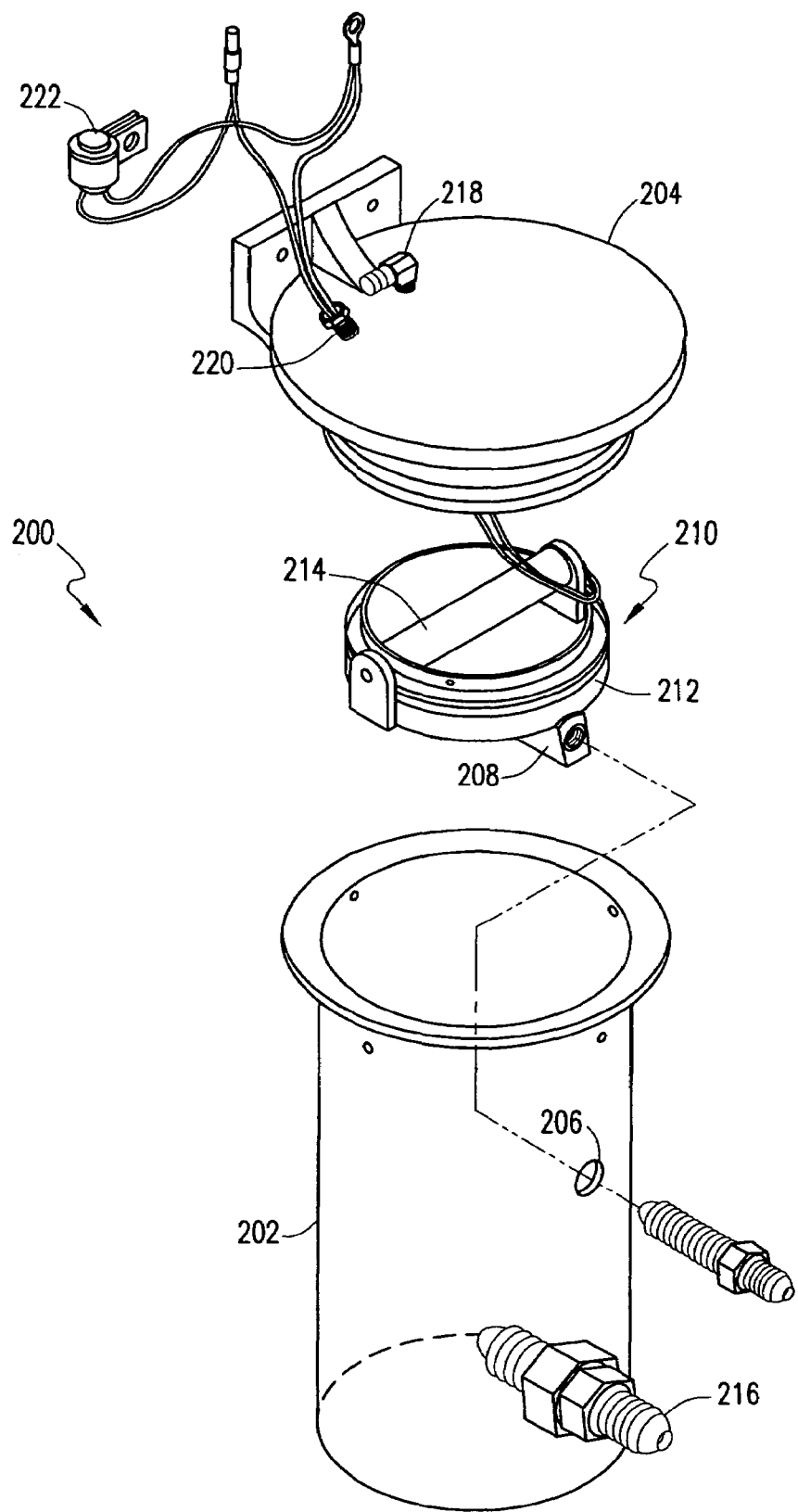
FIG. 4 is a perspective view of an evaporation canister in accordance with an embodiment of the present invention.

After the fluid passes through the filtration canister 100 and through the orifice 114, the filtered fluid is passed to an evaporation chamber 200 as shown in FIG. 4. In the preferred embodiment, the evaporation canister 200 is maintained at around atmospheric pressure to allow faster and more efficient evaporation of liquid contaminants that may be present in the fluid. The flow is controlled with a metering valve (not shown) and pressure is released via a conduit 218. The filtered fluid enters a container 202 of the evaporation canister 200 via an orifice that may be fitted with a hose connection 206. The filtered fluid passes through an inlet duct 208 to an evaporator 210. The fluid pools at the base of the evaporator 210 allowing the fluid to disperse over a large surface area. By increasing the surface area of the fluid, the liquid contaminants are more readily evaporated. In the preferred embodiment, the evaporator 210 includes a cup 212 and a heating wand 214, although other orientations and heating elements are possible.

The heating wand and evaporator cup assembly are housed within the evaporation canister. The evaporator cup has a base containing an orifice through which fluid flow is received. The orifice defines an opening at a floor of the evaporator cup for directing fluid into the evaporator cup. The heating wand is disposed adjacent the floor and over the opening to define a fluid volume within the evaporator cup and above the heating wand that is greater than a fluid volume within the evaporator cup and beneath the heating wand.

The fluid engulfs the heating wand 214 causing the fluid to heat to a temperature of about 195 to 205 degrees Fahrenheit. The interior of the cup 212 fills with heated fluid to the point at which the fluid spills over to the exterior of the cup 212. The exterior of the cup 212 includes various ridges that impede the flow of fluid to allow more contaminants to evaporate. The vaporized contaminants rise toward a head 204 of the evaporation canister 200 and exit the evaporation canister 200 via a conduit 218. The conduit 218 leads the contaminants to another location outside of the engine compartment. By capturing the contaminants and leading them away from the engine compartment, a user will not breathe in toxic fumes. The cleaned fluid continues to flow over the sides of the cup 212 and into a lower portion of the evaporation canister 200. An exit orifice 216 is located at the lower portion of the evaporation canister 200 for allowing the cleaned fluid to return to the engine.

The head 204 also includes an orifice 220 adapted for receiving conduits from the heating wand 214. The conduits are surrounded by a gasket that prevents the vaporized contaminants from leaking into the surrounding area. The conduits house wires for providing power to the heating wand 214 and also provide a visual indicator 222 to specify whether electrical power is flowing to the heating wand 214. The head 204 may also include at least one means for mounting the evaporation canister 200, such as orifices for receiving screws or bolts.

Figure 5:
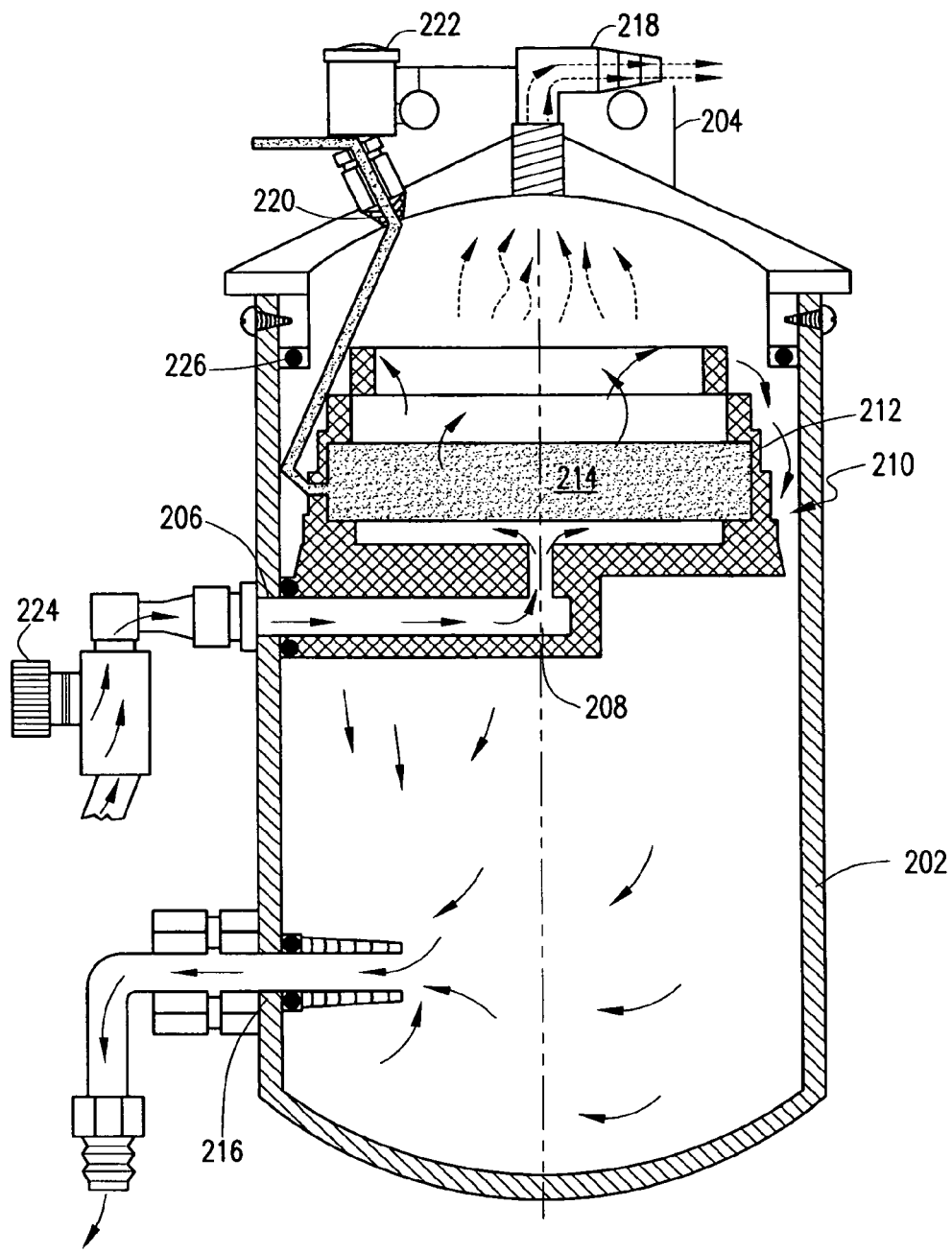
FIG. 5 is a side view of the evaporation canister in accordance with an embodiment of the present invention.

Referring now to FIG. 5, a side view of the evaporation canister 200 of an embodiment of the present invention is illustrated. As shown, the head 204 may include a gasket 226 for sealing the head 204 with the container 202. The flow of fluid is indicated with solid arrows and the flow of vaporized contaminants is indicated with dotted arrows. The filtered fluid flows through a metering valve 224 and into the inlet duct 208 via the hose connection 206. The fluid migrates to the evaporator 210 and dissipates into the area of the cup 212. The fluid is heated by the heating wand 214 and spills over the exterior of the cup 212. Vaporized contaminants exit the evaporation canister 200 via the conduit 218 while the cleaned fluid collects at the lower portion of the evaporation canister 200. The cleaned fluid flows back to the engine via the orifice 216.

Figure 6:
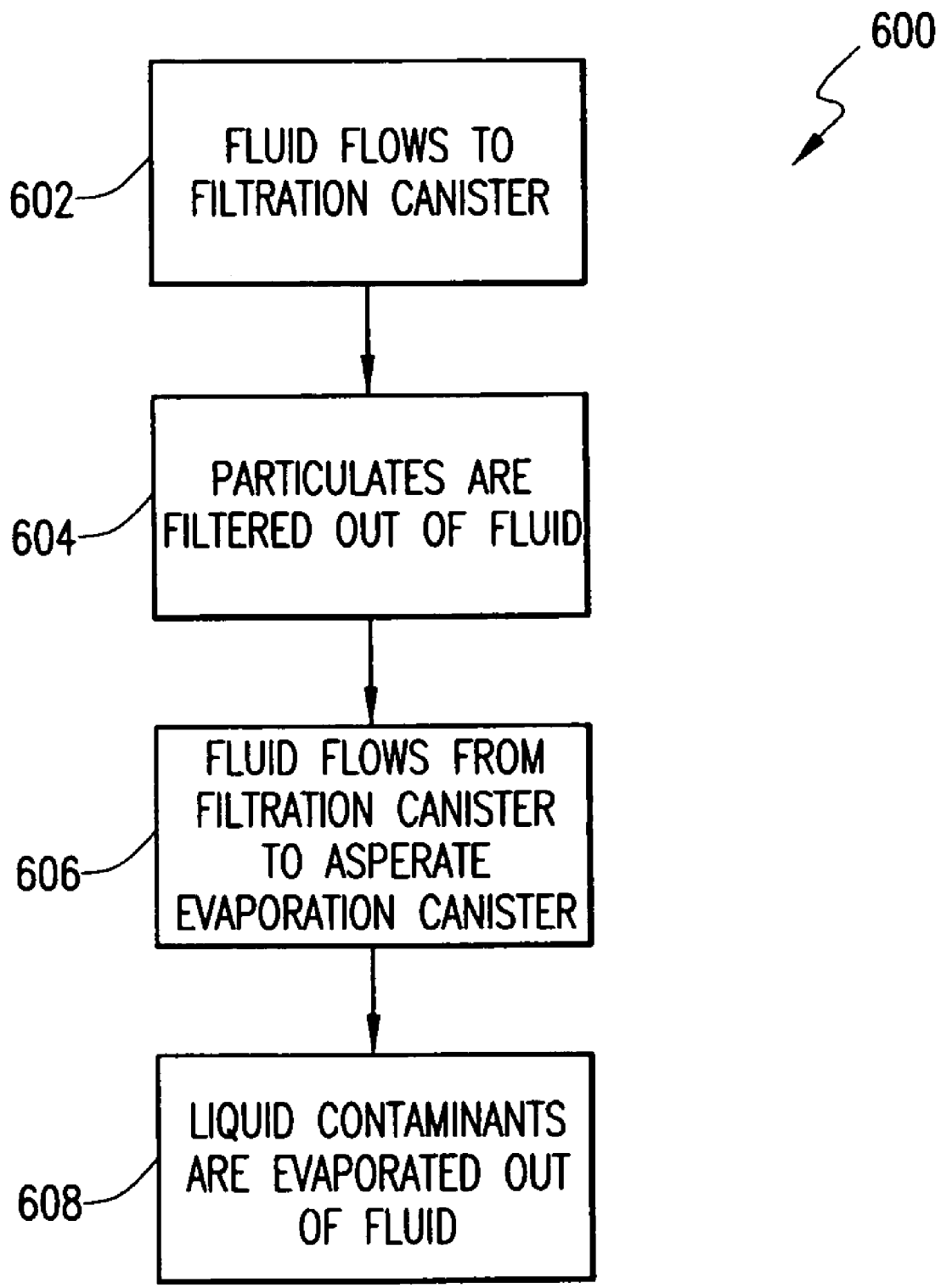
FIG. 6 is a flow diagram illustrating a method in accordance with an embodiment of the present invention.

Referring now to FIG. 6, a flow diagram of a method 600 of implementing the present invention is illustrated. At step 602, contaminated fluid flows from the engine to a filtration canister 100. As previously described, a shut-of valve may be incorporated for preventing the flow of fluid into the filtration canister 100 for some applications, i.e., sampling the fluid. At step 604, particulates are filtered out of the fluid via a filter element 118. The filter element 118 may be of a variety of types dependent upon the application. For example, hydraulic systems may require a finer type of filter element than an internal combustion engine. At step 606, fluid flows from the filtration canister 100 to a separate evaporation canister 200. A metering valve 224 may be incorporated between the filtration canister 100 and the evaporation canister 200 for controlling the amount of fluid that enters the evaporation canister 200. In the evaporation canister 200, at step 608, liquid contaminants are evaporated out of the filtered fluid. As previously shown, the vaporized contaminants exit the evaporation canister 200 via a conduit 218 and the cleaned fluid exits the evaporation canister 200 to return to the engine.

In summary, the two canister system as herein described facilitates accessibility, reliability, repairability, and ease in maintenance. It may be particularly adapted and suitable for, but not limited to, conventional diesel engines. In that regard, the previous description is of a preferred embodiment for implementing the invention, and the scope of the invention should not necessarily be limited by this description. The scope of the present invention is instead defined by the following claims.

What is claimed is:

1. A system for purifying fluid, said system comprising:
    a filtration canister for filtering particulates from the fluid and including:
    a cylindrical container,
    a filter element for removing the particulates from the fluid,
    the filtration canister adapted for receiving one of a plurality of types of the filter element and for receiving fluid via a pipe connection,
    a head for sealing an upper portion of the container,
    a threaded stud for securing the head and the container,
    a centering spring for securing the filter element around the threaded stud,
    means for securing and sealing the head and the filter element therein without allowing fluid to bypass the filter element; and
    a separate evaporation canister, in flow communication with the filtration canister, for removing liquid contaminants by evaporation and including:
    a heating wand and an evaporator cup assembly housed within the evaporation canister, said evaporator cup having a base containing an orifice through which fluid flow is received, said orifice defining an opening at a floor of the evaporator cup for directing fluid into the evaporator cup, the heating wand being disposed adjacent said floor and over said opening of the evaporator cup and defining a fluid volume within the evaporator cup and above the heating wand that is greater than a fluid volume within the evaporator cup and beneath the heating wand, wherein the fluid flow from the orifice engulfs the heating wand thereby facilitating heating of the fluid rising in the evaporator cup and the evaporation of the liquid contaminants.

2. The system of claim 1, wherein said filter element is adapted for filtering oil.

3. The system of claim 1, wherein said filter element is adapted for filtering hydraulic fluid.

4. The system of claim 1, wherein the head of the filtration canister comprises:

a compression ring for pressing against a portion of the filter element;

a first orifice for receiving oil from an engine;

a second orifice for receiving filtered oil; and a gasket for sealing the head against the filtration canister.

5. The system of claim 1, wherein said filtration canister further comprises:

a sampling valve for sampling fluid from the filtration canister;

wherein the sampling valve is adapted for sampling fluid during fluid flow into the filtration canister.

6. The system of claim 1 further comprising a shut-off valve for preventing flow of fluid into the filtration canister by causing the fluid to bypass the filtration canister.

7. The system of claim 1, wherein the evaporator cup is manufactured with exterior ridges for impeding the flow of the fluid.

8. The system of claim 1, wherein the evaporation canister comprises:

a visual indicator for alerting a user as to whether electrical power is supplied to the heating wand; and a conduit for receiving and removing vaporized liquid contaminants from the evaporation canister.

9. The system of claim 1 further comprising a metering valve located between the filtration canister and the evaporation canister for selective positioning to control fluid flow.

10. The system of claim 1, wherein the evaporation canister is formed of cold rolled steel and plated with Nickel Plating, and wherein the head of the evaporation canister is formed of Aluminum Alloy.

11. The system of claim 1, wherein the head of the evaporation canister comprises an orifice for receiving wires that supply electrical power to the heating wand.

12. The system of claim 1, wherein the cylindrical container of the filtration canister is formed of cold rolled steel and plated with Nickel Plating, and wherein the head of the filtration canister is formed of Aluminum Alloy.

13. The system of claim 1, wherein the head of the evaporation canister includes an outer raised edge that is oriented to be placed inside the container and prevents liquid from leaking out of the filtration canister.

14. A system for purifying fluid, said system comprising:

a filtration canister for filtering particulates from the fluid;

a separate evaporation canister, in flow communication with the filtration canister, for removing liquid contaminants by evaporation and including:

a heating wand and an evaporator cup assembly housed within the evaporation canister, said evaporator cup having a base containing an orifice through which fluid flow is received, said orifice defining an opening at a floor of the evaporator cup for directing fluid into the evaporator cup, the heating wand being disposed adjacent said floor and over said opening of the evaporator cup and defining a fluid volume within the evaporator cup and above the heating wand that is greater than a fluid volume within the evaporator cup and beneath the heating wand, wherein the fluid flow from the orifice engulfs the heating wand thereby facilitating heating of the fluid rising in the evaporator cup and the evaporation of the liquid contaminants.

* * * * *